United States Patent
Esbensen et al.

(10) Patent No.: US 11,012,446 B2
(45) Date of Patent: May 18, 2021

(54) MULTICAST SPLITTING (71) Applicant: Silicon Laboratories Inc., Austin, TX (US)

(72) Inventors: Anders Esbensen, København NV (DK); Jonas Roum-Møller, Hørsholm (DK); Jakob Buron, Søborg (DK)

(73) Assignee: Silicon Laboratories, Inc., Austin, TX (US)

( * ) Notice: Subject to any disclaimer, the term of this patent is extended or adjusted under 35 U.S.C. 154(b) by 173 days.

(21) Appl. No.: 16/218,710

(22) Filed: Dec. 13, 2018

(65) Prior Publication Data
US 2020/0195653 A1 Jun. 18, 2020

(51) Int. Cl.
H04L 29/06 (2006.01)

(52) U.S. Cl.
CPC ........ H04L 63/105 (2013.01); H04L 63/0428 (2013.01); H04L 65/103 (2013.01); H04L 65/4076 (2013.01); H04L 69/08 (2013.01)

(58) Field of Classification Search
CPC ... H04L 63/105; H04L 69/08; H04L 63/0428; H04L 65/103; H04L 65/4076; H04L 65/1033; H04L 67/10; H04L 12/2803; H04L 69/18; H04L 65/605; H04L 67/12; H04L 12/185; H04L 12/283; H04L 12/66; H04L 67/34; H04W 12/033
See application file for complete search history.

(56) References Cited

U.S. PATENT DOCUMENTS

| | | | |
|---|---|---|---|
| 6,049,878 A | 4/2000 | Caronni et al. | |
| 2007/0266174 A1* | 11/2007 | Bestler | H04L 12/18 709/238 |
| 2009/0083536 A1* | 3/2009 | Weis | H04L 63/065 713/153 |
| 2010/0260254 A1* | 10/2010 | Kimmich | H04N 21/631 375/240.01 |
| 2016/0007138 A1* | 1/2016 | Palanisamy | H04W 4/50 455/41.2 |

(Continued)

OTHER PUBLICATIONS

Office action dated May 14, 2020 in co-pending U.S. Appl. No. 16/227,843.

(Continued)

*Primary Examiner* — Harunur Rashid
(74) *Attorney, Agent, or Firm* — Nields, Lemack & France, LLC (57) ABSTRACT

A system and method for transmitting packets to a plurality of network devices that cannot be accessed via a single multicast message is disclosed. The system includes a gateway controller that received a multicast request from a client, and creates a plurality of multicast messages based on the number of different security classes. The gateway controller parses the request from the client and identifies all of the desired destination nodes. The gateway controller then identifies the security class that each of these destination nodes belongs to. Based on this, the gateway controller then creates one or more multicast messages, where each multicast message is intended for the destination nodes that belong to a single security class. In certain embodiments, the gateway controller also aggregates the acknowledgments from the destination nodes and forwards this information to the client.

14 Claims, 6 Drawing Sheets

(56) References Cited

U.S. PATENT DOCUMENTS

2017/0104669 A1* 4/2017 Bell .................... H04L 65/4076
2017/0223807 A1* 8/2017 Recker .............. H02J 13/00017
2018/0014387 A1   1/2018 Bard et al.
2020/0204384 A1   6/2020 Esbensen et al.

OTHER PUBLICATIONS

Notice of allowance dated Sep. 28, 2020 in co-pending U.S. Appl. No. 16/227,843.

* cited by examiner

| MULTICAST GROUP ID | LIST OF NODES | CRYPTOGRAPHIC STATE INFORMATION |
|---|---|---|
| 1 | 102a, 102b, 102c, 102d | 2875488604386318738 |
| 2 | 102a, 102b | 9813589015635681965 |
| ... | | |
| N | 102a, 102c, 102d | 8215789234875468879 |

FIG. 6

MULTICAST SPLITTING

FIELD

This disclosure describes systems and methods for sending multicast messages in a network, and more particularly, sending multicast messages to devices that belong to different security classes.

BACKGROUND

In most wireless networks, data is communicated between devices using packets of information. In certain embodiments, packets are transmitted from a source to a specific destination through the use of a routing protocol. In other embodiments, packets are transmitted from a source to a plurality of destinations simultaneously through the use of multicast messages.

An example of the use of multicast messages in smart home applications occurs when a controller wants to turn on or off a group of devices. The controller issues a multicast message that is intended for all of the network devices associated with the group of devices. By using multicast messages, it is perceived by the user that these operations are performed at the same time. Furthermore, the use of multicast messages reduces the amount of network traffic as multiple devices receive the same message.

Additionally, these smart home network devices are becoming more sophisticated and more concerned about security. For example, the network protocols associated with each network may include network security keys that are used to encrypt all transmissions. Network devices may be assigned to different security classes based on their function and their capabilities.

At times, a client may wish to transmit a multicast message to a plurality of network devices. However, these network devices may belong to different security classes, making it impossible to reach all of these nodes with a single multicast message.

Therefore, it would be advantageous if there were a system and method of transmitting a multicast message to a plurality of network devices that belong to different security classes. Further, it would be beneficial if this system and method did not add additional complexity to those network devices.

SUMMARY

A system and method for transmitting packets to a plurality of network devices that cannot be accessed via a single multicast message is disclosed. The system includes a gateway controller that receives a multicast request from a client, and creates a plurality of multicast messages based on the number of different security classes. The gateway controller parses the request from the client and identifies all of the desired destination nodes. The gateway controller then identifies the security class that each of these destination nodes belongs to. Based on this, the gateway controller then creates one or more multicast messages, where each multicast message is intended for the destination nodes that belong to a single security class. In certain embodiments, the gateway controller also aggregates the acknowledgments from the destination nodes and forwards this information to the client.

According to one embodiment, a method of using a gateway controller to communicate with a plurality of destination nodes, wherein the destination nodes utilize a network protocol that supports multicast and multiple security classes is disclosed. The method comprises receiving at a second network interface of the gateway controller, a request from a client that is destined for the plurality of destination nodes; determining within the gateway controller whether the plurality of destination nodes belong to different security classes and determining a number of different security classes; creating a multicast message for destination nodes that belong to a first security class; transmitting the multicast message using a first network interface of the gateway controller to the destination nodes that belong to the first security class; and repeating the creating and transmitting for each different security class. In certain embodiments, the network protocol comprises Z-Wave protocol. In certain embodiments, the method further comprises encrypting the multicast message using a key unique to the first security class. In certain embodiments, the method further comprises including a multicast group identifier unique to the first security class in the multicast message. In some embodiments, the multicast message to a security class comprises a packet format that is unique to that security class. In certain embodiments, the method further comprises receiving acknowledgments from each of the plurality of destination nodes to the gateway controller; and transmitting an aggregated acknowledgment to the client. In certain embodiments, the gateway controller requests acknowledgments from each of the plurality of destination nodes prior to receiving the acknowledgments.

According to another embodiment, a gateway controller is disclosed. The gateway controller comprises a first network interface utilizing a network protocol that supports multicast and multiple security classes; a second network interface; a processing unit; and a memory device in communication with the processing unit, comprising instructions, which, when executed by the processing unit, enable the gateway controller to: receive at the second network interface, a request from a client that is destined for a plurality of destination nodes accessible via the first network interface; determine whether the plurality of destination nodes belong to different security classes and determine a number of different security classes; create a multicast message for destination nodes that belong to a first security class; transmit the multicast message using the first network interface to the destination nodes that belong to the first security class; and repeat the create and transmit for each different security class. In certain embodiments, the network protocol comprises Z-Wave protocol. In certain embodiments, the memory device further comprises instructions that enable the gateway controller to encrypt the multicast message using a key unique to the first security class. In certain embodiments, the memory device further comprises instructions that enable the gateway controller to include a multicast group identifier unique to the first security class in the multicast message. In some embodiments, the multicast message to a security class comprises a packet format that is unique to that security class. In certain embodiments, the memory device further comprises instructions that enable the gateway controller to receive acknowledgments from each of the plurality of destination nodes to the gateway controller; and transmit an aggregated acknowledgment to the client. In certain embodiments, the memory device further comprises instructions that enable the gateway controller to request acknowledgments from each of the plurality of destination nodes prior to receiving the acknowledgments.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
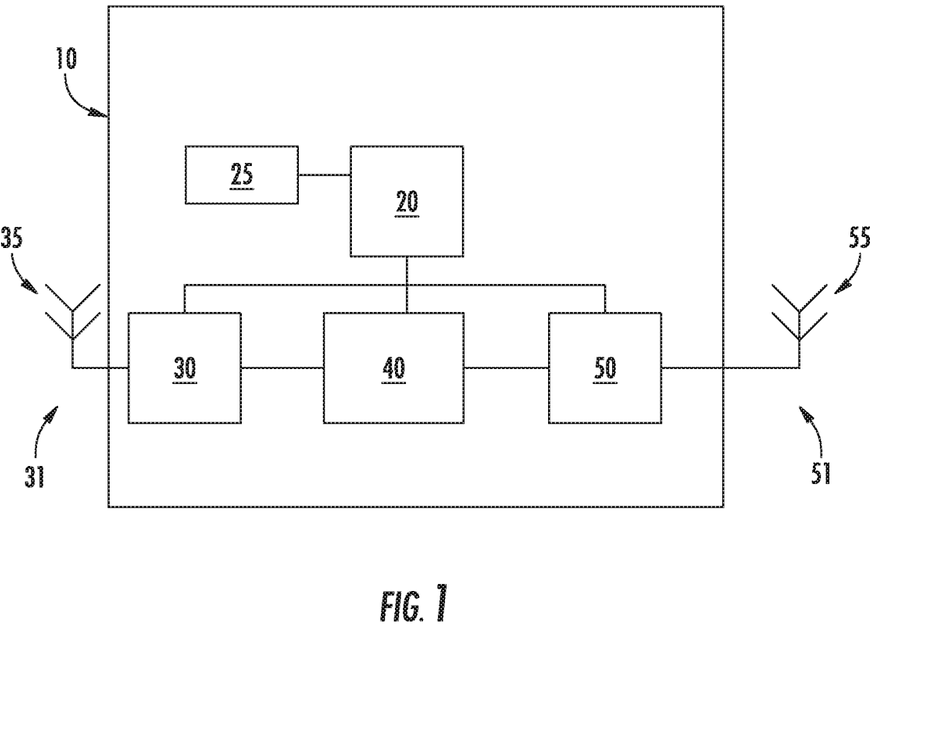
FIG. 1 is a block diagram of a representative network device.

FIG. 1 shows a block diagram of a representative network device 10. This network device may serve as a gateway controller or a destination node, as described in more detail below.

As shown in FIG. 1, the network device 10 has a processing unit 20 and an associated memory device 25. The processing unit may be any suitable component, such as a microprocessor, embedded processor, an application specific circuit, a programmable circuit, a microcontroller, or another similar device. This memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

The network device 10 also includes a network interface 30, which may be a wireless interface including an antenna 35. The network interface 30 may support any wireless network that supports multiple security classes and multicast, such as WiFi, networks utilizing the IEEE 802.15.4 specification, such as Zigbee, networks utilizing the IEEE 802.15.6 specification, and wireless smart home protocols, such as Z-Wave. The network interface 30 is used to allow the network device 10 to communicate with other devices disposed on the first network 31.

In certain embodiments, the network device 10 includes a second network interface 50, which may also be a wireless interface including an antenna 55. The second network interface 50 may support any wired or wireless network, such as Ethernet, WiFi, or others. The second network interface 50 is used to allow the network device 10 to communicate with other devices disposed on the second network 51.

The network device 10 may include a second memory device 40 in which data that is received and transmitted by the network interface 30 and the second network interface 50 is stored. This second memory device 40 is traditionally a volatile memory. The processing unit 20 has the ability to read and write the second memory device 40 so as to communicate with the other nodes in the first network 31 and the second network 51. Although not shown, the network device 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

While the processing unit 20, the memory device 25, the network interface 30, the second network interface 50 and the second memory device 40 are shown in FIG. 1 as separate components, it is understood that some or all of these components may be integrated into a single electronic component. Rather, FIG. 1 is used to illustrate the functionality of the network device 10, not its physical configuration.

Figure 2:
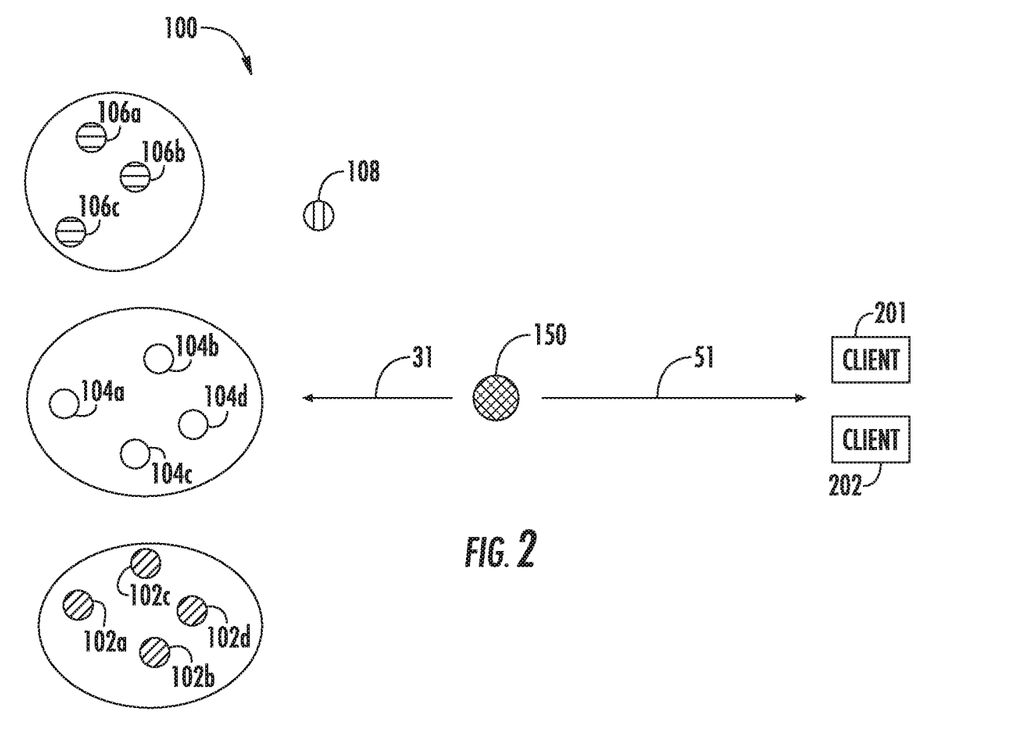
FIG. 2 shows a network having a plurality of network devices, including a gateway controller, clients and a plurality of destination nodes according to one embodiment.

FIG. 2 shows a network 100 having a plurality of network devices and a gateway controller 150. The plurality of network devices may include one or more devices. These network devices may be embedded in various elements, such as door locks, garage doors, sensors, light switches, light dimmers, light bulbs, thermostats, sensors, smart appliances and others.

Each of these network devices may contain some or all of the components described above and shown in FIG. 1. The architecture of the gateway controller 150 may differ somewhat from that of the other network devices. For example, the gateway controller 150 may have a more powerful processing unit 20. The memory device 25 and the second memory device 40 of the gateway controller 150 may have a greater capacity than that in other network devices. Further, the gateway controller 150 may be powered by a wall outlet, rather than a battery. In certain embodiments, the gateway controller 150 may also include the second network interface 50 to connect to another wired or wireless network. For example, the gateway controller 150 may also be connected to an IP network, such as Ethernet or WiFi. Some or all of the other network devices may not include the second network interface 50.

Certain network protocols, such as Z-Wave, assign each network device a specific security class. For example, Z-Wave defines a "S2 Access Control" class that is the most trusted class, and is intended to cover access control devices, such as door locks and garage doors. Z-Wave also defines a "S2 Authenticated" class that is used for most other elements, such as sensors, thermostats and light switches. A "S2 unauthorized" class is the least trusted class and is intended only for devices that have limited capability. Further, in certain embodiments, the network 100 may also include older devices which operate using the S0 security framework. The S0 security framework is a legacy security protocol that has been superseded by the S2 security framework.

The network devices join the network 100 by being included by the gateway controller 150. The process by which these network devices are admitted to a security class is well documented.

Within the S2 security framework, each class communicates using a unique security key. In other words, communications among network devices in the "S2 Access Control" class are encrypted using a security key that is only known to these network devices. In this way, communications among this class of network devices cannot be intercepted and decrypted by other network devices. Similarly, communications among network devices in the "S2 Authenticated" class cannot be intercepted and decrypted by network devices in the "S2 Unauthenticated" class.

FIG. 2 shows a representative network 100, comprising a gateway controller 150 and a plurality of nodes. The gateway controller 150 has a first network interface that interfaces with the first network 31. The first network 31 may be a Z-wave network, a Zigbee network, or any other network that supports multicast and multiple security classes. The first network 31 may include a plurality of network devices, including destination nodes 102*a-d*, 104*a-d*, 106*a-c* and 108. These network devices may be parts of different security classes. In FIG. 2, destination nodes 102*a-d* are part of the "S2 Access Control" class, the destination nodes 104*a-d* are part of the "S2 Authenticated" class, and the destination nodes 106*a-c* are part of the "S2 Unauthenticated" class. The number of network devices that belong to each security class is not limited by this disclosure. Rather, this figure is purely illustrative. In addition, one or more legacy devices 108, which utilize the S0 security framework, may also be part of the network 100.

In addition to utilizing different security keys, there may be other differences. For example, legacy devices 108 may utilize a different packet format for multicast messages.

Figure 3A:
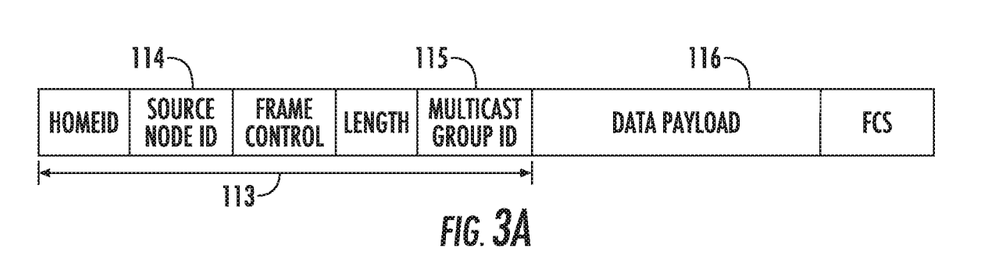
FIGS. 3A-3B show the format of a S2 multicast message and a non-secure multicast message, respectively, according to one embodiment.
Figure 3B:
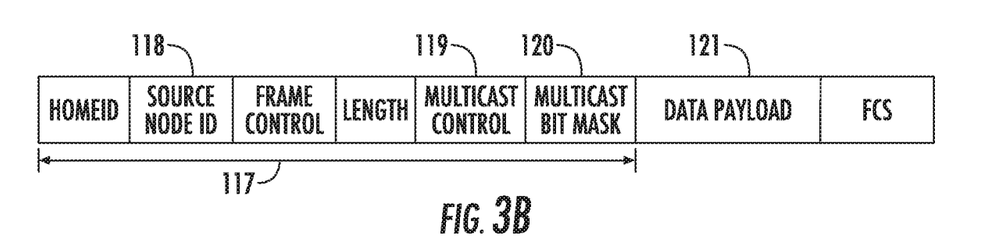

FIG. 3A shows a typical multicast message used for S2 network devices. This multicast message includes a header 113. Within the header is the source node ID 114 and a multicast group identifier (ID) 115. The multicast message also has a data payload 116, which typically follows the header 113. FIG. 3B represents the format of a typical multicast message used for legacy devices 108. This multicast message has a header 117 that includes the source node ID 118 and a multicast control field 119. The header 117 also includes a bit mask 120 which allows the network devices to determine whether they are part of this multicast group. The multicast message also has a data payload 121 that follows the header 117.

The gateway controller 150 may be capable of communicating with all of the network devices, regardless of their security class. In other words, the gateway controller 150 may possess the security keys associated with each security class. In one embodiment, shown in FIG. 6, the gateway controller 150 may include a table showing the multicast group identifier, the network devices that belong to that multicast group ID and the security key for that multicast group ID.

As shown in FIG. 2, the gateway controller 150 also has a second network interface that interfaces with the second network 51. The second network 51 may be a wired or wireless network. In some embodiments, the second network 51 may utilize an IP protocol, such as Ethernet or WiFi. One or more nodes, also referred to as clients, may be part of second network 51. In this embodiment, two nodes, referred to as client 201 and client 202 are shown, although the number of nodes is not limited.

These clients may be any suitable device, such as a smart phone, laptop computer, desktop computer, tablet or any other computing device having a network interface.

The nodes, or clients, on the second network 51 may communicate using addresses that are unique to the second network 51, such as IP addresses. Similarly, the devices on the first network 31 may communicate using addresses that are unique to that first network 31. The gateway controller 150 has the capability to translate an address from the first network 31 to an address on the second network 51, and vice versa.

Figure 4:
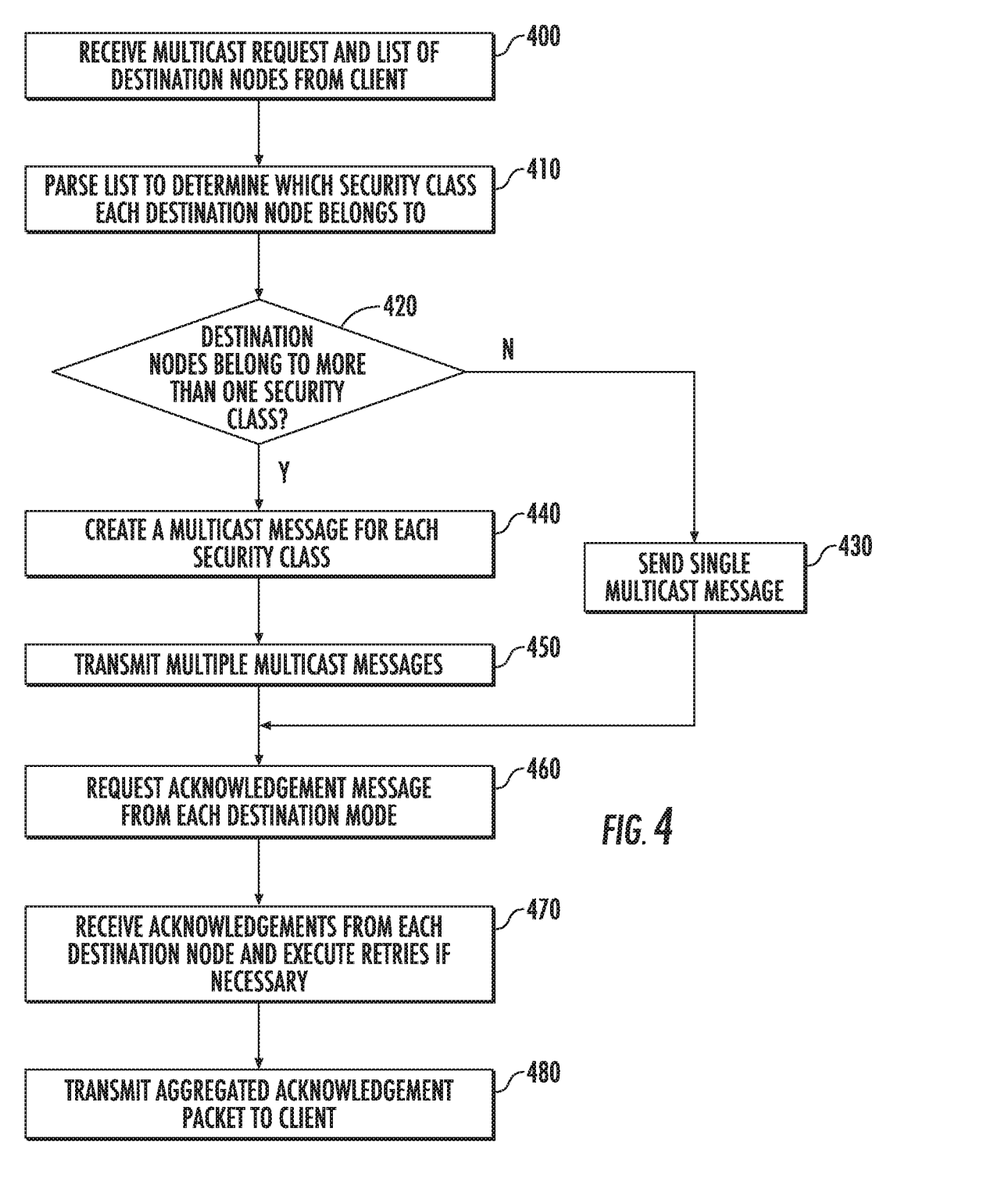
FIG. 4 is a representative flowchart showing the operation of the gateway controller.

In certain embodiments, a client on the second network 51, such as client 201 or client 202, may wish to send a message to a plurality of network devices on the first network 31, referred to as destination nodes. The client may transmit this request to the gateway controller 150. The gateway controller 150 may execute a set of instructions in order to transmit this message to the desired destination nodes. A flowchart of these instructions is shown in FIG. 4.

Figure 6:
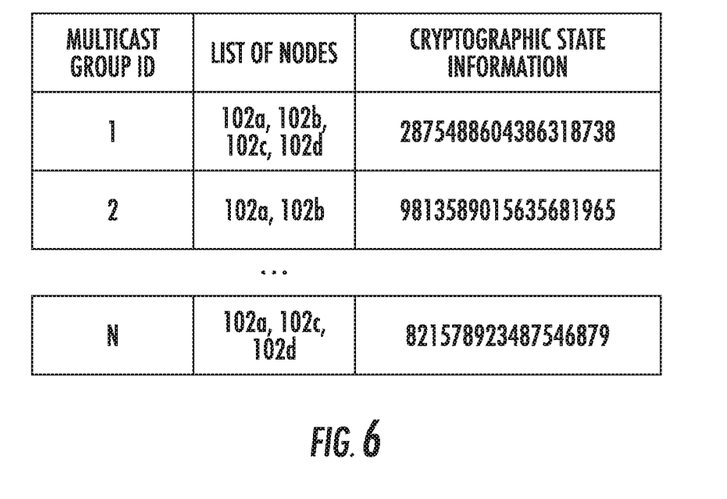
FIG. 6 is a representative table illustrating the relationship between multicast group ID, nodes and cryptographic information.

As shown in Process 400, the gateway controller 150 may receive the multicast request from a client 201. That request may also include a list of destination nodes that the multicast message is intended for. In certain embodiments, the second network 51 is an IP network, such as WiFi or Ethernet. In this embodiment, the client 201 may indicate the desired destination nodes through the use of IP addresses. In other words, each network device on the first network 31 has a corresponding IP address that is used by nodes on the second network 51 to address that network device. The gateway controller 150 can then translate the addresses provided by the client 201 to the addresses used on the first network 31. The gateway controller 150 may then parse the list of destination nodes and determine which security class each destination node belongs to, as shown in Process 410. The gateway controller 150 may maintain a table in its memory. This table may include a list of all known network devices, their network addresses, and their respective security class. As previously stated, the gateway controller 150 may also maintain a second table that contains the multicast group identifier, a list on nodes in that multicast group and the cryptographic state information for that multicast group. A representative drawing of this table is shown in FIG. 6.

Next, the gateway controller 150 determines whether the destination nodes belong to more than one security class, as shown in Process 420. If the destination nodes all belong to a single security class, the gateway controller 150 transmits a single multicast message to the destination nodes, as shown in Process 430. In certain embodiments, the multicast group that comprises the destination nodes for a single security class already exists. For example, one of the multicast groups identified in the table shown in FIG. 6 may include exactly the destination nodes of a particular security class that are to be transmitted to. In this embodiment, the gateway controller 150 simply uses this multicast group. In another embodiment, a multicast group that comprises exactly the destination nodes of a single security class may not exist. In this embodiment, the gateway controller 150 may create a new multicast group.

If the destination nodes are not all part of the same security class, the gateway controller 150 may then create a plurality of multicast messages, as shown in Process 440. As described above, Z-Wave defines three different security classes. Further, legacy devices 108 may also be included in the network 100. Each of these classes may require a separate multicast message.

The gateway controller 150 then transmits these multiple multicast messages, as shown in Process 450. In some cases, these multicast message differ in at least one of the following ways:

Different security key used for encryption;
Different multicast group identifier (ID); and
Different message format.

For example, the gateway controller 150 may send a first multicast message to one or more of the destination nodes 102*a-d*; a second multicast message to one or more of the destination nodes 104*a-d*; and a third multicast message to one or more of the destination nodes 106*a-d*. Further, the gateway controller 150 may send a multicast message to any legacy devices 108 that are among the destination nodes.

The gateway controller 150 may then request an acknowledgment message from each of the destination nodes, as shown in Process 460.

Alternatively, the destination nodes will each send an acknowledgment within a suitable time interval. In this embodiment, the function shown in Process 460 may not be performed. Thus, in some embodiments, the function shown in Process 460 is optional.

The gateway controller 150 then receives acknowledgments from each of the destination nodes, as shown in Process 470. As is well known, Z-Wave also defines a retry protocol that may be executed by the gateway controller 150 in the event that an acknowledgment is not received from one or more of the destination nodes. This retry protocol may comprise sending a singlecast message to each destination node that fails to transmit an acknowledgment.

After the gateway controller 150 receives an acknowledgment from all of the destination nodes, or has exhausted all retries to the non-responsive destination nodes, it generates an aggregate acknowledgment packet, which is transmitted to the client, as shown in Process 480.

Figure 5:
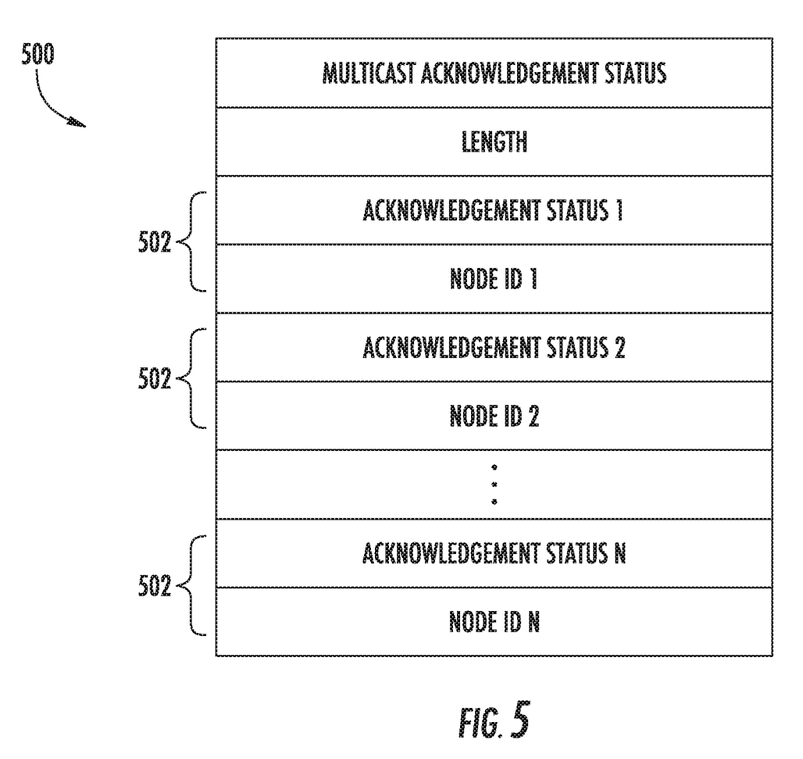
FIG. 5 shows the format of an aggregated acknowledgment packet according to one embodiment.

In one embodiment, shown in FIG. 5, the aggregated acknowledgment packet 500 may comprise a plurality of fields 502, where each field represents the identity and status of one of the destination nodes. The value of that field may be indicative of whether that destination node received the multicast message.

In another embodiment, the gateway controller 150 may aggregate the application level status codes in a single acknowledgment message.

The present system has many advantages. First, the Z-Wave protocol does not define a multicast message that covers multiple security classes. Therefore, traditionally, multicast cannot be used when the desired destination nodes belong to different security classes. The traditional use of singlecast message to communicate with uses more network bandwidth and consumes more time than the multicast messages described herein.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of using a gateway controller to communicate with a plurality of destination nodes, wherein the destination nodes utilize a network protocol that supports multicast and multiple security classes, comprising:
   receiving at a second network interface of the gateway controller, a request from a client that is destined for the plurality of destination nodes;
   determining within the gateway controller whether the plurality of destination nodes belong to different security classes and determining a number of different security classes;
   identifying a multicast group to be used for exactly all of the destination nodes that belong to a first security class, wherein identifying the multicast group comprises:
      using an existing multicast group if a multicast group already exists for all of the destination nodes that belong to the first security class; or
      otherwise creating a new multicast group if a multicast group does not already exist for all of the destination nodes that belong to the first security class;
   creating a multicast message for destination nodes that belong to a first security class using the multicast group;
   transmitting the multicast message using a first network interface of the gateway controller to all of the destination nodes that belong to the first security class; and
   repeating the identifying, creating and transmitting for each different security class.

2. The method of claim 1, wherein the network protocol comprises Z-Wave protocol.

3. The method of claim 1, further comprising encrypting the multicast message using a key unique to the first security class.

4. The method of claim 1, further comprising including a multicast group identifier unique to the first security class in the multicast message.

5. The method of claim 1, wherein the multicast message to a security class comprises a packet format that is unique to that security class.

6. The method of claim 1, further comprising:
   receiving acknowledgments from each of the plurality of destination nodes to the gateway controller; and
   transmitting an aggregated acknowledgment to the client.

7. The method of claim 6, wherein the gateway controller requests acknowledgments from each of the plurality of destination nodes prior to receiving the acknowledgments.

8. A gateway controller, comprising:
   a first network interface utilizing a network protocol that supports multicast and multiple security classes;
   a second network interface;
   a processing unit; and
   a memory device in communication with the processing unit, comprising instructions, which, when executed by the processing unit, enable the gateway controller to:
      receive at the second network interface, a request from a client that is destined for a plurality of destination nodes accessible via the first network interface;
      determine whether the plurality of destination nodes belong to different security classes and determine a number of different security classes;

identify a multicast group to be used for exactly all of the destination nodes that belong to a first security class, wherein the gateway controller identifies the multicast group by:
  using an existing multicast group if a multicast group already exists for all of the destination nodes that belong to the first security class; or
  otherwise creating a new multicast group if a multicast group does not already exist for all of the destination nodes that belong to the first security class;
create a multicast message for destination nodes that belong to a first security class using the multicast group;
transmit the multicast message using the first network interface to the destination nodes that belong to the first security class; and
repeat the identify, create and transmit for each different security class.

9. The gateway controller of claim 8, wherein the network protocol comprises Z-Wave protocol.

10. The gateway controller of claim 8, wherein the memory device further comprises instructions that enable the gateway controller to encrypt the multicast message using a key unique to the first security class.

11. The gateway controller of claim 8, wherein the memory device further comprises instructions that enable the gateway controller to include a multicast group identifier unique to the first security class in the multicast message.

12. The gateway controller of claim 8, wherein the multicast message to a security class comprises a packet format that is unique to that security class.

13. The gateway controller of claim 8, wherein the memory device further comprises instructions that enable the gateway controller to:
  receive acknowledgments from each of the plurality of destination nodes to the gateway controller; and
  transmit an aggregated acknowledgment to the client.

14. The gateway controller of claim 13, wherein the memory device further comprises instructions that enable the gateway controller to:
  request acknowledgments from each of the plurality of destination nodes prior to receiving the acknowledgments.

* * * * *